United States Patent [19]

Cropper

[11] Patent Number: 5,819,178
[45] Date of Patent: Oct. 6, 1998

[54] METHODS AND APPARATUS FOR ACCESSING SUBSCRIBER INFORMATION IN INTERCONNECTED WIRELESS TELECOMMUNICATIONS NETWORKS

[75] Inventor: Harry Cropper, Richardson, Tex.

[73] Assignee: Northern Telecom Limited

[21] Appl. No.: 583,591

[22] Filed: Jan. 5, 1996

[51] Int. Cl.[6] .................................................. H04Q 7/20
[52] U.S. Cl. .................. 455/433; 455/422; 455/432; 455/435
[58] Field of Search ................................ 455/422, 412, 455/428, 429, 432, 433, 435, 436, 445, 561

[56] References Cited

U.S. PATENT DOCUMENTS

| | | | |
|---|---|---|---|
| 5,210,787 | 5/1993 | Hayes et al. | 455/435 |
| 5,369,684 | 11/1994 | Buhl et al. | 455/432 |
| 5,479,481 | 12/1995 | Koivunen | 455/433 |
| 5,506,887 | 4/1996 | Emery et al. | 455/433 |
| 5,537,457 | 7/1996 | Lantto et al. | 455/433 |
| 5,621,783 | 4/1997 | Lantto et al. | 455/445 |

Primary Examiner—Dwayne D. Bost
Assistant Examiner—Nay Maung
Attorney, Agent, or Firm—Foley & Lardner

[57] ABSTRACT

In methods and apparatus for obtaining subscriber data for a mobile terminal roaming in a service area of a visited wireless network, the visited wireless network receives from the roaming mobile terminal a registration request specifying an identifier. If subscriber data corresponding to the identifier cannot be found at an HLR of the visited wireless network or at a VLR associated with the HLR, an Intersystem Roaming (ISR) database is searched for an address corresponding to the identifier. If such an address is found, a subscriber data request is transmitted to the address. If no such address is found, the subscriber data request is broadcast to plural wireless networks connected to the visited wireless network. Subscriber data received in response to the subscriber data request is stored in the VLR, and an address corresponding to the identifier is stored in the ISR. The methods and apparatus are particularly useful for supporting roaming of mobile terminals that cannot identify the location of their subscriber data.

20 Claims, 8 Drawing Sheets

METHODS AND APPARATUS FOR ACCESSING SUBSCRIBER INFORMATION IN INTERCONNECTED WIRELESS TELECOMMUNICATIONS NETWORKS

FIELD OF INVENTION

This invention relates to methods and apparatus for accessing subscriber information in interconnected wireless telecommunications networks as is required to support roaming of subscribers between areas served by the interconnected wireless networks.

BACKGROUND OF INVENTION

A conventional wireless telecommunications network comprises base stations, Mobile Switching Centers (MSCs) equipped with Visitor Location Registers (VLRs) and a Home Location Register (HLR). Each base station provides radio communications to mobile terminals located in a respective cell or zone of the wireless network. The base stations are interconnected by the MSCs which provide telecommunications switching functions. The HLR contains subscriber data which defines the services which each mobile terminal is authorized to receive and controls access to those services. The MSCs are connected to the HLR to access the subscriber data.

When a mobile terminal is activated in a zone of the wireless network, it sends a registration request to the base station serving the zone in which it is located. The registration request includes a Mobile Identification Number (MIN) which uniquely identifies the mobile terminal. The serving base station forwards the registration request to the serving MSC, which then forwards the registration request to the HLR. The HLR searches for subscriber data corresponding to the MIN in the registration request. If such subscriber data is located, the HLR downloads the subscriber data to the VLR of the serving MSC. The serving MSC then uses the subscriber data to perform any required authentication tests and, upon such tests being satisfied, provides services as defined by the subscriber data to the mobile terminal.

Some wireless networks are connected to other wireless networks, and support mobile terminals which roam into their service areas from the service areas of the other wireless networks. Subscriber data for roaming mobile terminals must be downloaded from the HLRs of their home networks to the VLR of the serving MSC in the serving network. In North American cellular telephone systems, roaming mobile terminals send enough information to the serving MSC in the registration request to enable the serving MSC to locate and establish communications with the HLR of the mobile terminal's home network, so that the required subscriber data can be downloaded to the VLR of the serving MSC.

However, some other wireless systems, for example CT2 systems, do not support roaming. The mobile terminals for such systems do not store the identity of their home network and therefore cannot incorporate the identity of their home network in registration requests. Consequently, the serving MSC cannot locate and download subscriber data for roaming mobile terminals in the conventional manner described above.

SUMMARY OF INVENTION

An object of this invention is to provide improved methods and apparatus for providing subscriber information in interconnected wireless telecommunications networks. The improved methods and apparatus are particularly suited to applications in which roaming terminals cannot identify the location of their subscriber data.

One aspect of this invention provides a method of obtaining subscriber data for a mobile terminal roaming into a service area of a visited wireless network. The method comprises receiving a registration request from the mobile terminal at the visited wireless network, the registration request comprising an identifier. A Home Location Register (HLR) of the visited wireless network is searched for subscriber data corresponding to the identifier. Upon failure to find subscriber data corresponding to the identifier at the HLR, a Visitor Location Register (VLR) of the visited wireless network is searched for subscriber data corresponding to the identifier. Upon failure to find subscriber data corresponding to the identifier at the VLR, an Intersystem Roaming (ISR) database is searched for an address corresponding to the identifier. Upon finding an address corresponding to the identifier in the ISR database, a subscriber data request comprising the identifier is transmitted to the address.

The method, upon failure to find an address corresponding to the identifier in the ISR database, may further comprise broadcasting a subscriber data request to plural wireless networks connected to the visited wireless network.

A timer may be started upon broadcasting the subscriber data request, and stopped when subscriber data corresponding to the identifier is received at the visited wireless network. Refusal of the registration request may be initiated when the timer exceeds a predetermined time and no subscriber data corresponding to the identifier has been received at the visited wireless network.

Upon receiving subscriber data corresponding to the identifier at the visited wireless network, the subscriber data may be temporarily stored at the VLR of the visited wireless network, and an address corresponding to the identifier may be stored at the ISR database.

The subscriber data may be time stamped when stored at the VLR and the subscriber data may be deleted from the VLR when the subscriber data has been stored for a predetermined time.

Plural addresses may be received at the visited wireless network, each address corresponding to a respective identifier. Each address may be stored with its respective identifier at the ISR database. When an occupancy of the ISR database exceeds a predetermined threshold, an address and its respective identifier may be selected for deletion. Each address may be time stamped when stored at the ISR database, and the step of selecting the address may comprise selecting the address based on a value of its respective time stamp. The respective timer may be reset each time an address is read at the ISR database.

Another aspect of the invention provides a system for supporting roaming of mobile terminals into a service area of a wireless network. The system comprises a Visitor Location Register (VLR) for temporarily storing subscriber data for mobile terminals provisioned on other wireless networks and an Intersystem Roaming (ISR) database for storing addresses in association with identifiers. The system further comprises search means responsive to a failure to find subscriber data associated with a particular identifier specified in a registration request to search the VLR for subscriber data associated with the particular identifier. The search means is responsive to failure to find subscriber data associated with the particular identifier in the VLR to search the ISR database for an address associated with the particular identifier. The system further comprises transmission means responsive to location of an address associated with the particular identifier in the ISR database to transmit a subscriber data request comprising the particular identifier to the address.

The transmission means may be responsive to failure to locate an address associated with the particular identifier in the ISR database to broadcast a subscriber data request to plural other wireless systems.

The system may further comprise storage means responsive to receipt of subscriber data from other wireless systems to temporarily store the received subscriber data at the VLR and to store an address corresponding to the particular identifier at the ISR database.

The system may also comprise timing means for starting a timer in response to broadcast of a subscriber data request and for stopping the timer in response to receipt of the requested subscriber data. The timing means may be operable to initiate refusal of the registration request when the timer exceeds a predetermined time and no subscriber data corresponding to the identifier has been received.

BRIEF DESCRIPTION OF DRAWINGS

Embodiments of the invention are described below by way of example only. Reference is made to accompanying drawings in which.

DETAILED DESCRIPTION

Figure 1:
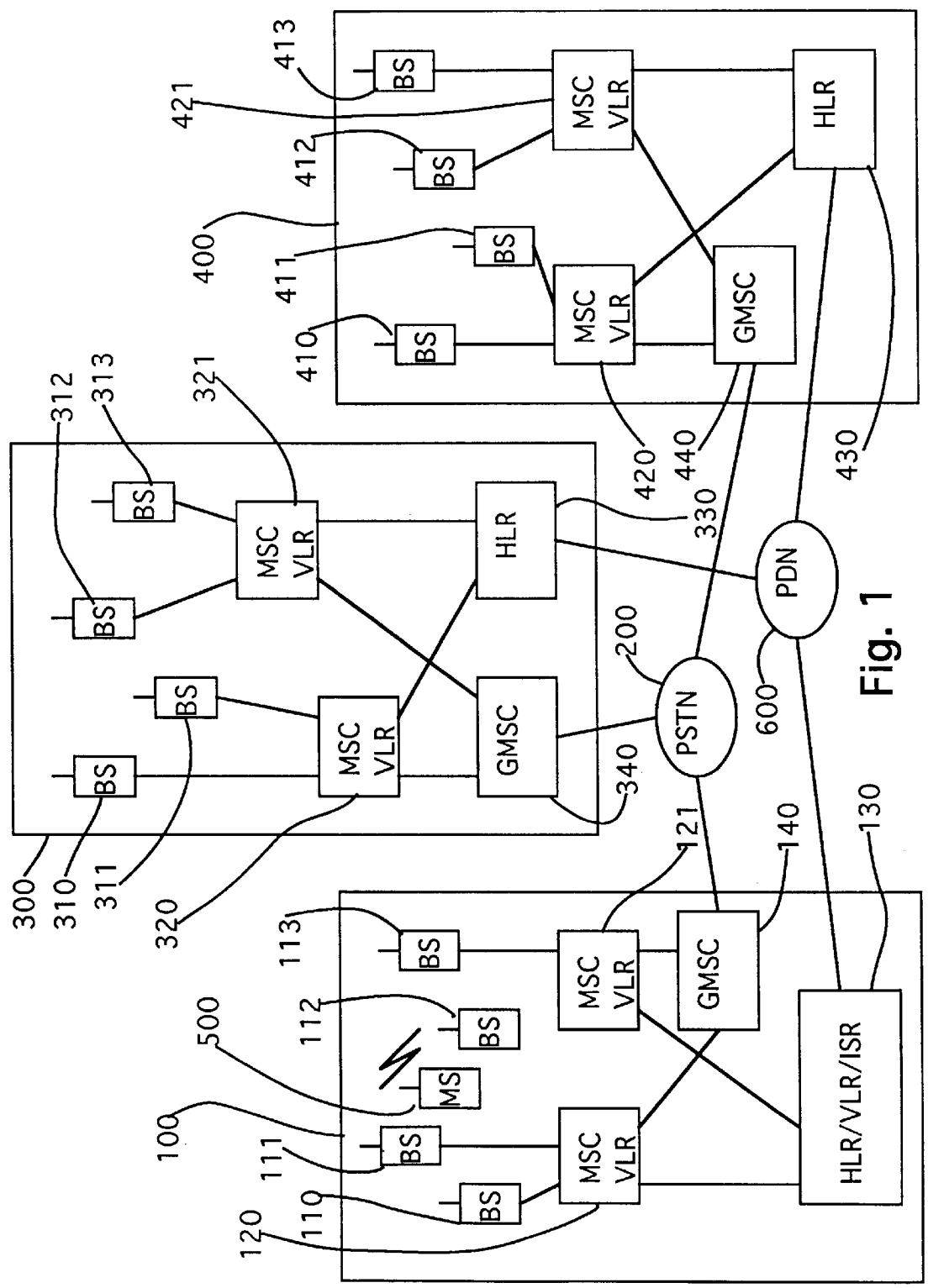
FIG. 1 is a block schematic diagram of three distinct wireless networks interconnected to provide telecommunications service to mobile terminals roaming between areas served by the distinct wireless networks.

FIG. 1 is a block schematic diagram of three distinct wireless networks interconnected to provide telecommunications service to mobile terminals roaming between areas served by the distinct wireless networks. The wireless networks operate according to a CT2 air interface standard.

A first wireless network 100 comprises base stations 110, 111, 112, 113, Mobile Switching Centers (MSCs) 120, 121 equipped with Visitor Location Registers (VLRs) and a combined Home Location Register, Visitor Location Register and Intersystem Roaming database (HLR/VLR/ISR) 130. Each base station 110, 111, 112, 113 provides radio communications to mobile terminals located in a respective cell or zone of the wireless network 100. The base stations 110, 111, 112, 113 are interconnected by the MSCs 120, 121 which provide telecommunications switching functions. HLR functionality of the HLR/VLR/ISR 130 contains subscriber data which defines the services which each mobile terminal is authorized to receive and controls access to those services. The MSCs 120, 121 are connected to the HLR/VLR/ISR 130 to access the subscriber data. The wireless network 100 further comprises a Gateway MSC (GMSC) 140 which connects the MSCs 120, 121 to a Public Switched Telephone Network (PSTN) 200 so that mobile terminals served by the wireless network 100 can be connected to terminals connected to the PSTN 200.

Similarly, a second wireless network 300 comprises base stations 310, 311, 312, 313, MSCs 320, 321 equipped with VLRs, a HLR 330 and a GMSC 340 connected to the PSTN 200, and a third wireless network 400 comprises base stations 410, 411, 412, 413, MSCs 420, 421 equipped with VLRs, a HLR 430 and a GMSC 440 connected to the PSTN 200. Mobile terminals served by any of the wireless networks 100, 300, 400 can be connected to mobile terminals served by any other of the wireless networks via the PSTN 200.

Figure 2:
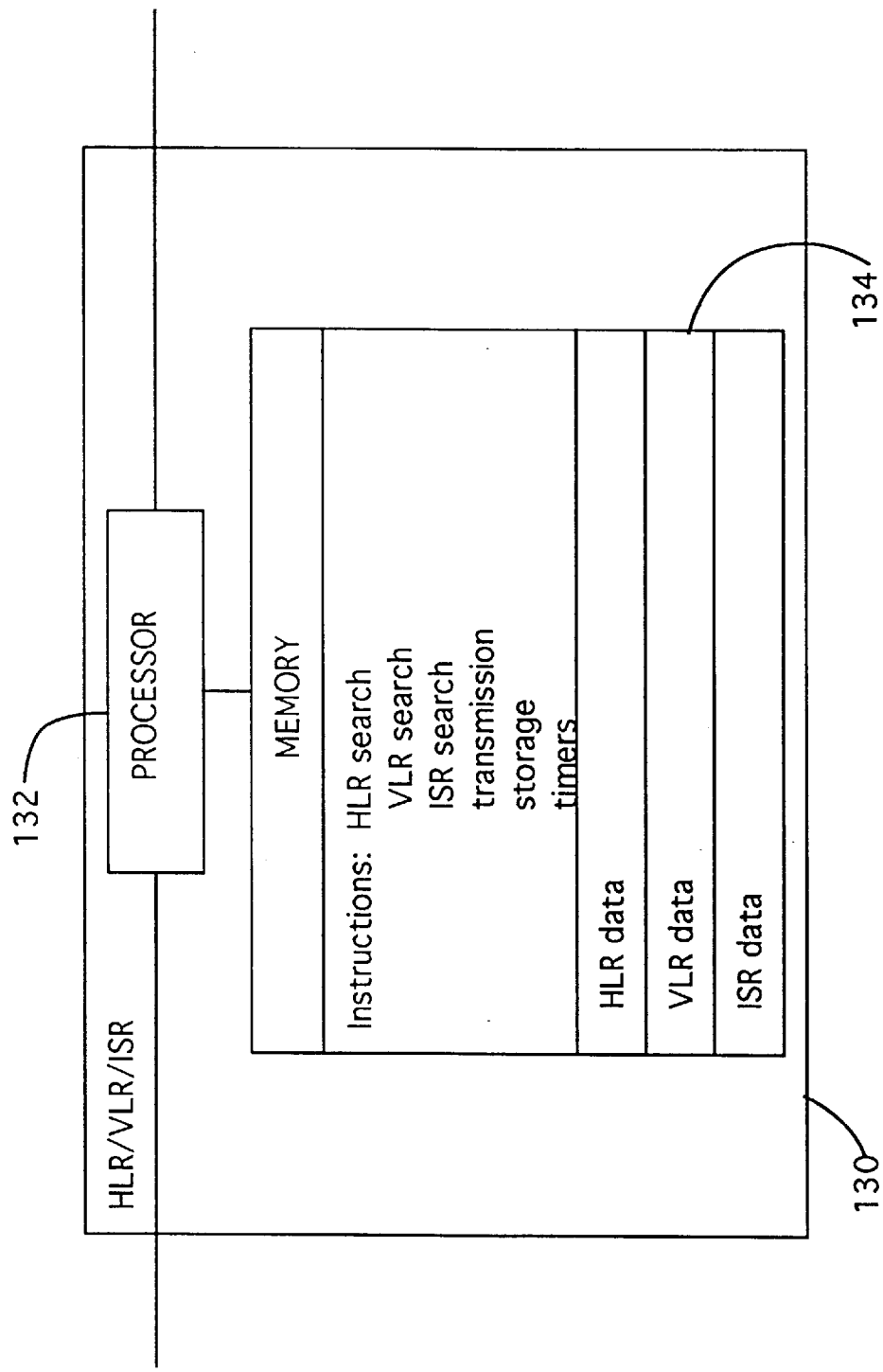
FIG. 2 is a block schematic diagram showing one implementation of a HLR/VLR/ISR functional block of FIG. 1.

FIG. 2 is a block schematic diagram showing one implementation of the HLR/VLR/ISR 130 of the first wireless network. The HLR/VLR/ISR 130 comprises a processor 132 and a memory 134 storing instructions for execution by the processor and data for use by the processor in executing those instructions. The instructions include an HLR search routine, a VLR search routine, and ISR search routine, a transmission routine, a storage routine and timer routines which will be described in greater detail below. The data includes an HLR database containing subscriber data for mobile terminals provisioned on the first wireless network, a VLR database for temporary storage of subscriber data for mobile terminals provisioned on other wireless networks, and an ISR database for temporary storage of Mobile Identification Numbers (MINs) and associated addresses at which is stored subscriber data corresponding to the MINs.

Figure 3A:
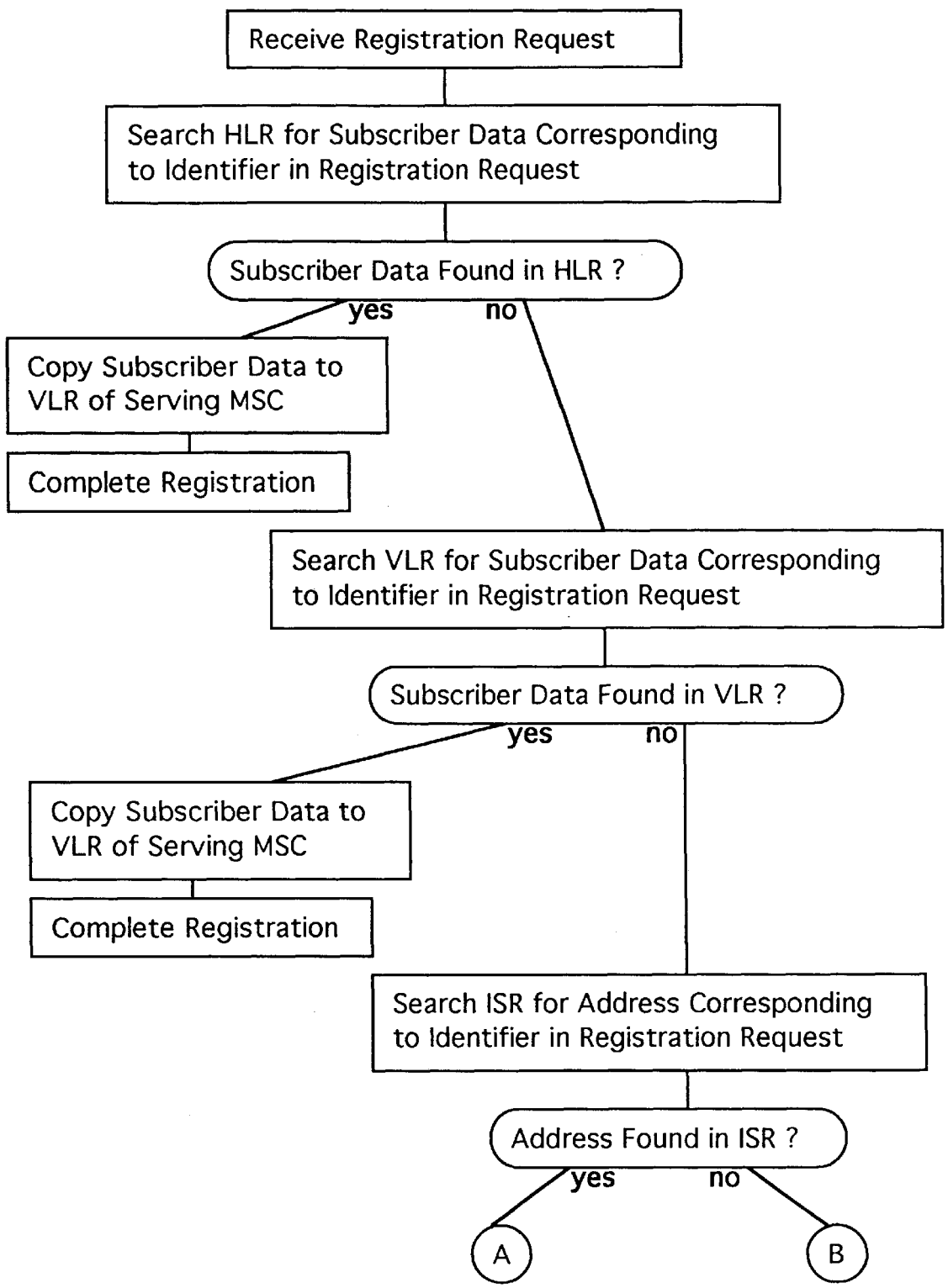
FIGS. 3A, 3B and 3C are a flow chart illustrating operations performed by one of the wireless networks of FIG. 1 to access subscriber data.
Figure 3B:
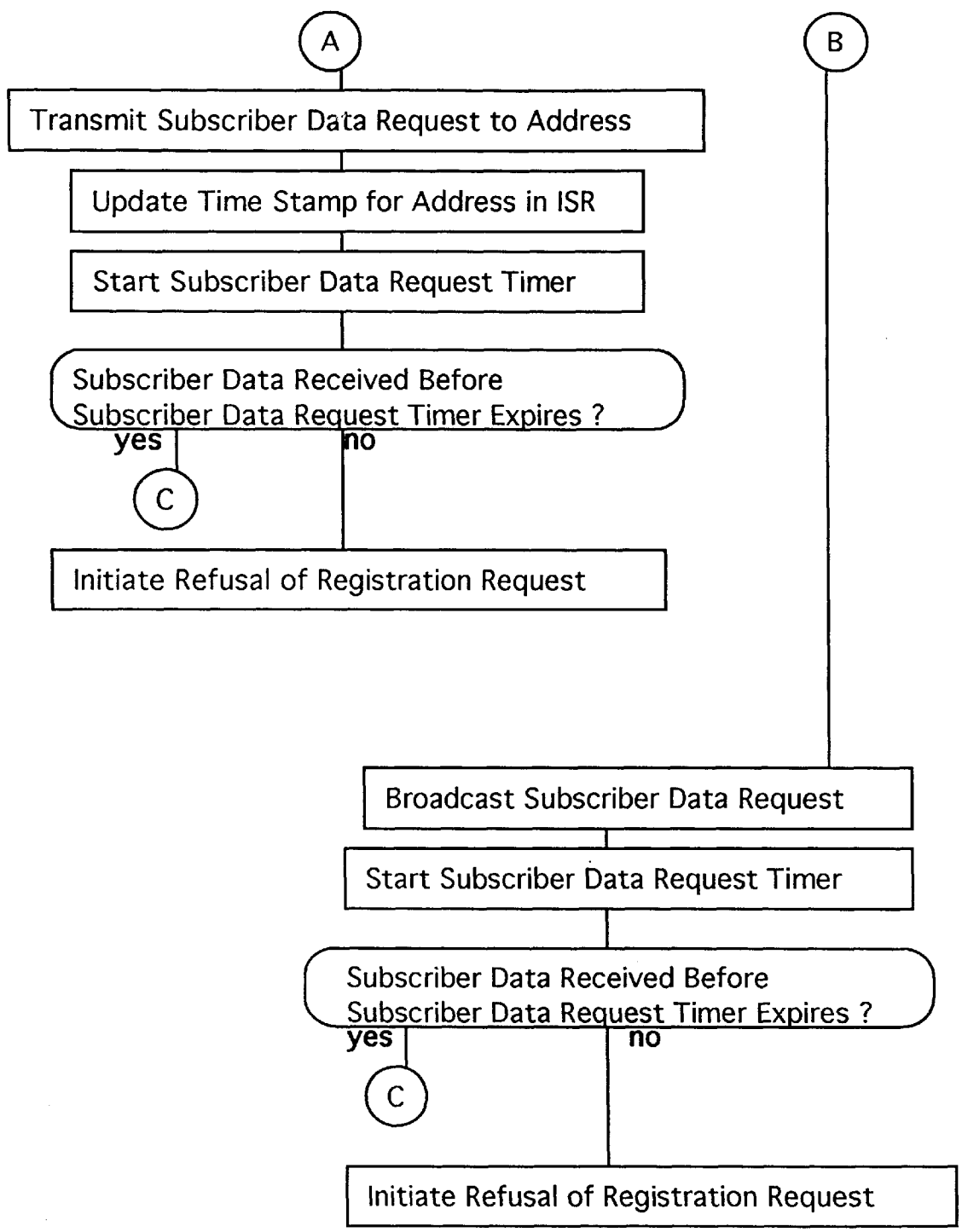
Figure 3C:
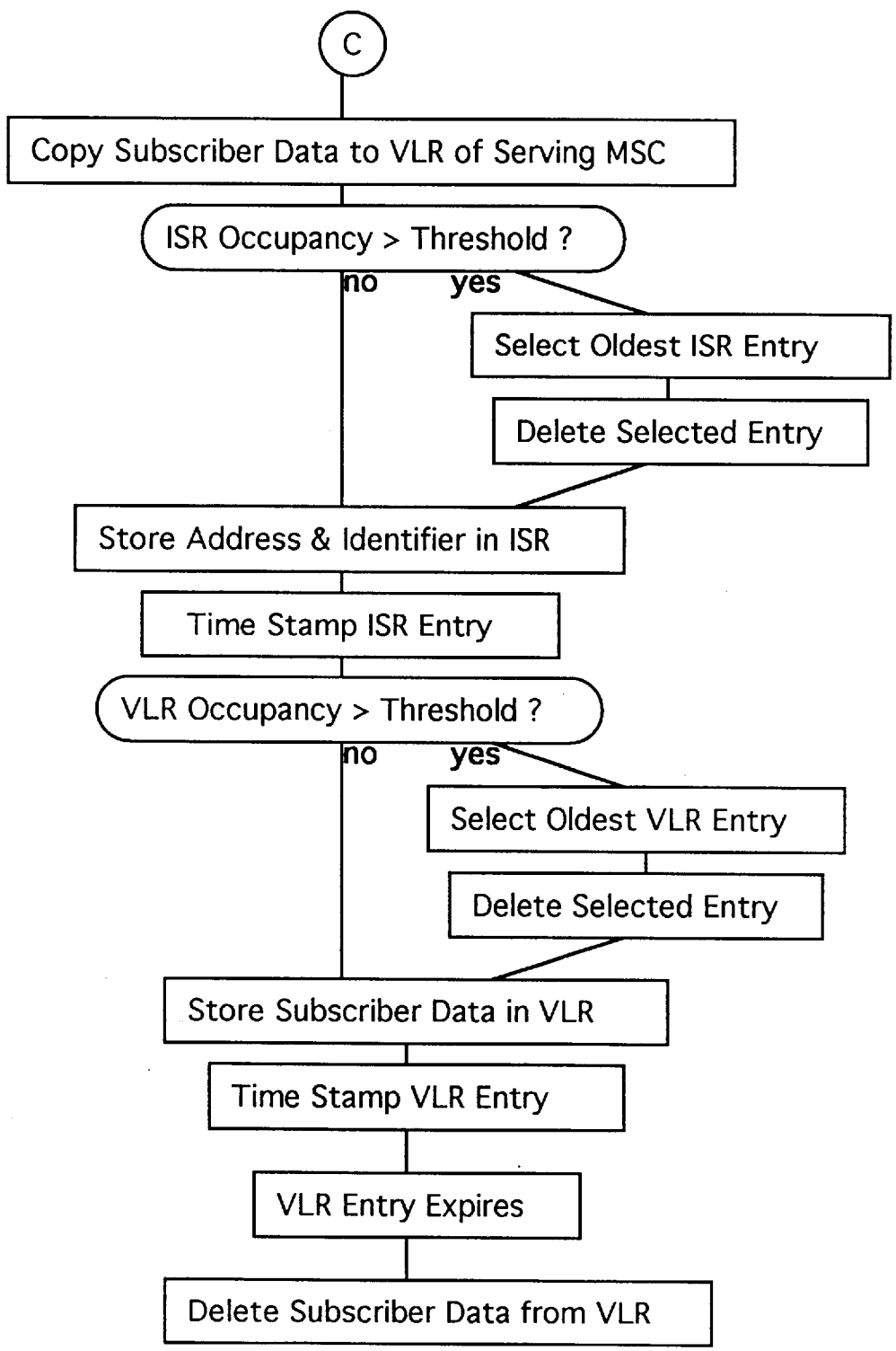
Figure 4:
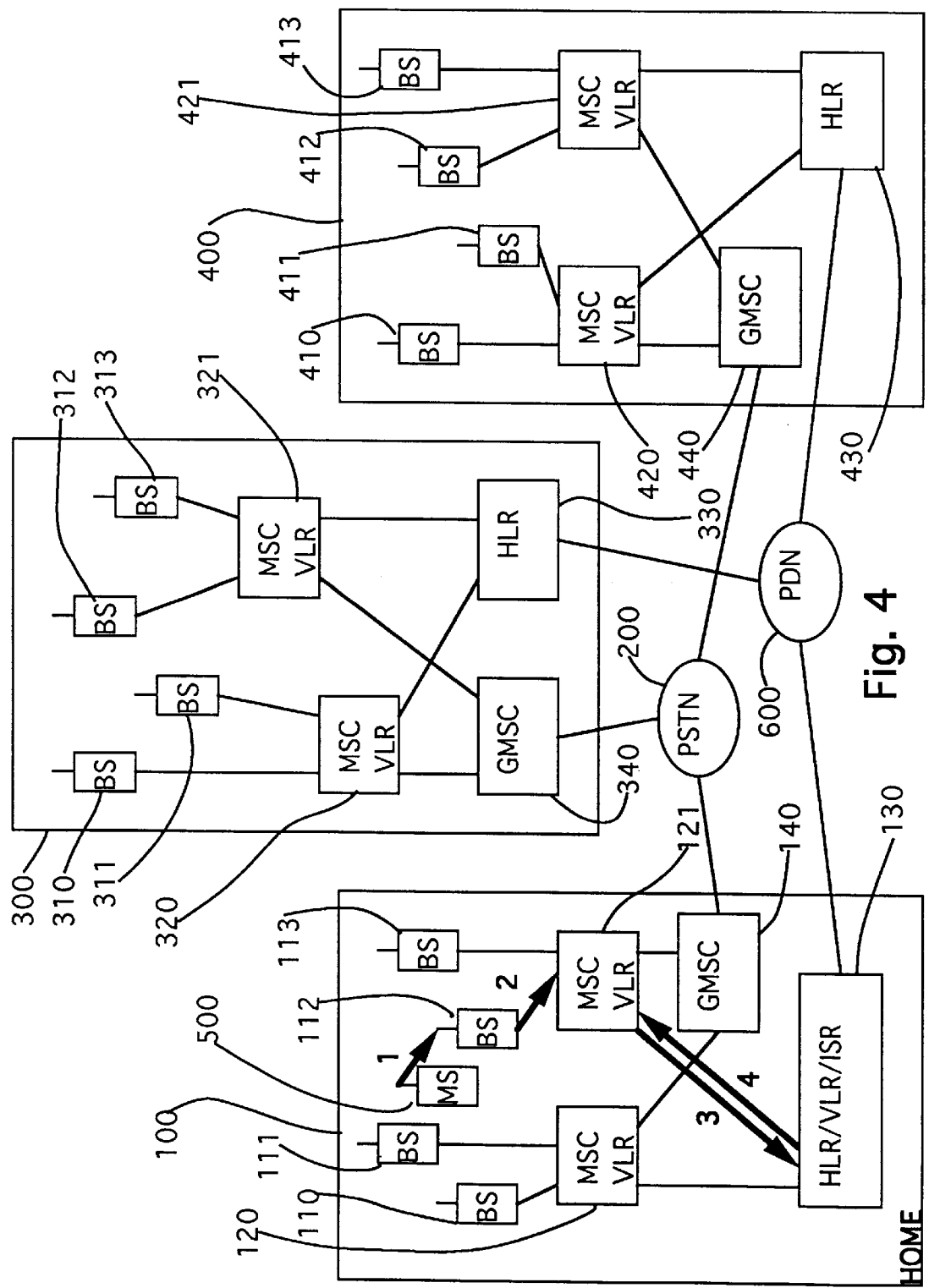
FIG. 4 is the block schematic diagram of FIG. 1 showing message flows required for registration of a mobile terminal in its home wireless network.

FIGS. 3A, 3B and 3C are a flow chart illustrating operations performed by the first wireless network 100 to access subscriber data when a mobile terminal attempts to register. FIG. 4 is the block schematic diagram of FIG. 1 showing message flows required for registration of a mobile terminal 500 in its home wireless network 100. When the mobile terminal 500 is activated in a zone of the wireless network 100, it sends a registration request (message flow 1) to the base station 112 serving the zone in which it is located. The registration request includes a Mobile Identification Number (MIN) which uniquely identifies the mobile terminal 500. The serving base station 112 forwards the registration request to the serving MSC 121 (message flow 2), which then forwards the registration request to the HLR/LVR/ISR 130 (message flow 3). The HLR/VLR/ISR 130 searches the HLR database for subscriber data corresponding to the MIN in the registration request. If such subscriber data is located, the HLR/VLR/ISR 130 copies the subscriber data to the VLR of the serving MSC 121 (message flow 4). The serving MSC 121 then uses the subscriber data to perform any required authentication tests and, upon such tests being satisfied, provides services as defined by the subscriber data to the mobile terminal 500.

The first wireless network 100 is configured to support mobile terminals which roam into its service area from the service areas of the other two wireless networks 300, 400. To enable such roaming, the HLR/VLR/ISR 130 of first wireless network 100 includes VLR and ISR functionality as outlined above, and is connected to the HLRs 330, 430 of the second and third wireless networks 300, 400 via a packet data network (PDN) 600.

Figure 5:
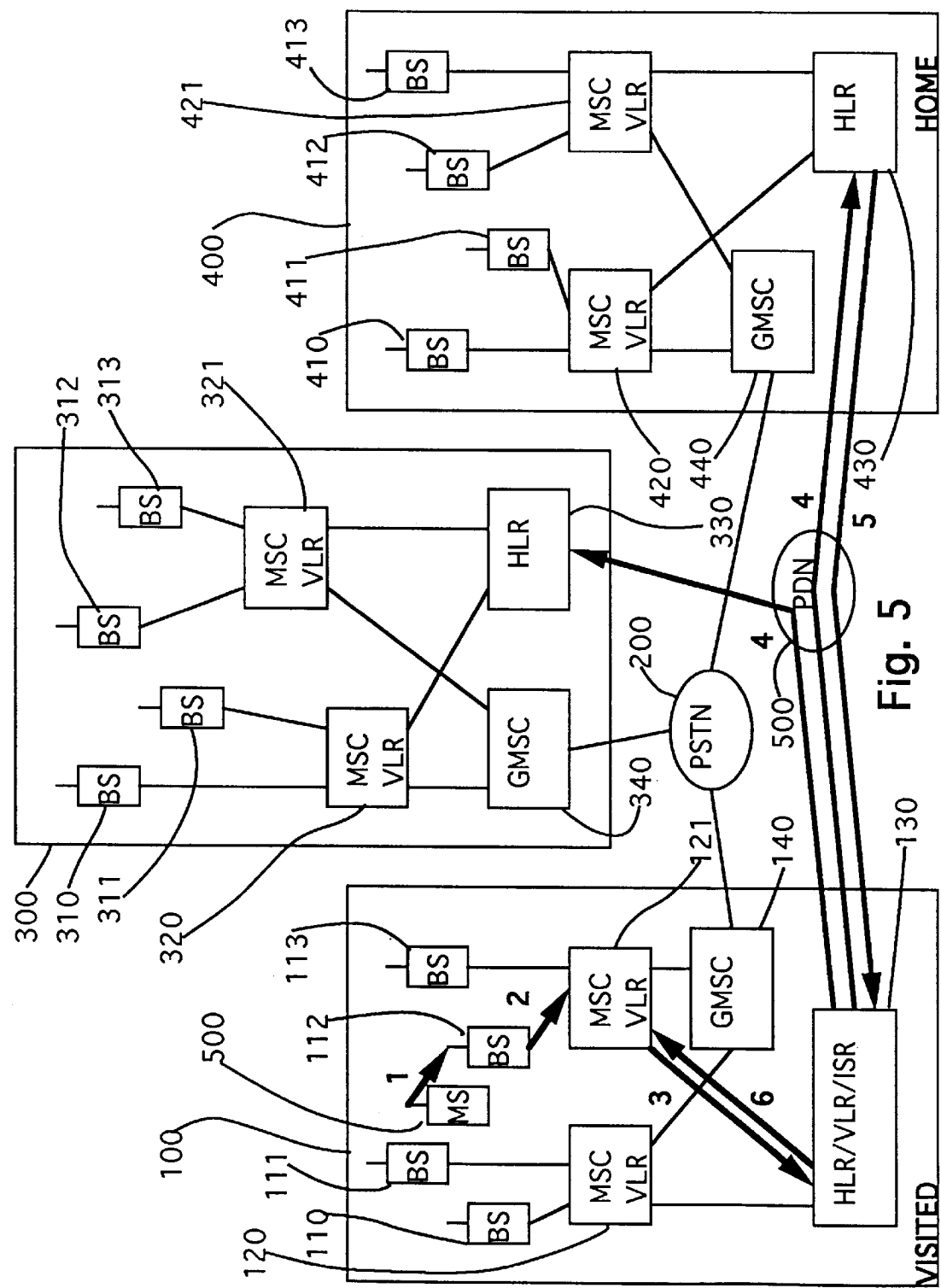
FIG. 5 is the block schematic diagram of FIG. 1 showing message flows required for registration of a mobile terminal in a wireless network other than its home wireless network.

FIG. 5 is the block schematic diagram of FIG. 1 showing message flows required for registration of the mobile terminal 500 in the first wireless network 100 when the home network for the wireless terminal 500 is the third wireless network 400. Upon receiving a registration request from a mobile terminal 500 (message flow 1), the serving base station 112 forwards the registration request to the serving MSC 121 (message flow 2) and from the serving MSC 121 to the HLR/VLR/ISR 130 (message flow 3) as described above. Because the first wireless network 100 is not the home network for the mobile terminal 500, subscriber data corresponding to the MIN in the registration request is not found in the HLR database of HLR/VLR/ISR 130.

The HLR/VLR/ISR 130 then searches the VLR database for subscriber data corresponding to the MIN in the registration request. Assuming that the roaming mobile terminal 500 has not previously registered at the first wireless network 100, subscriber data corresponding to the MIN in the registration request is not found in the VLR database of HLR/VLR/ISR 130.

The HLR/VLR/ISR 130 of the serving wireless network 100 then searches the ISR database for an address corresponding to the MIN in the registration request. Because the roaming mobile terminal 500 has not previously registered at the first wireless network 100, no such address is found.

The HLR/VLR/ISR 130 then starts a subscriber data request timer and broadcasts a subscriber data request to the HLRs 330, 430 of the other wireless networks 300, 400 via the PDN 600 (message flows 4). Each of the HLRs 330, 430 which receive the broadcasted subscriber data request search for subscriber data corresponding to the MIN specified in the subscriber data request. Because the second wireless network 300 is not the home network of the mobile terminal 500, its HLR 330 fails to find subscriber data corresponding to the MIN in the subscriber data request. Consequently, this HLR 330 does not respond to the subscriber data request.

However, the HLR 430 of the home network 400 of the mobile terminal 500 does locate subscriber data corresponding to the MIN specified in the subscriber data request and responds to the subscriber data request by copying the subscriber data to the HLR/VLR/ISR 130 of the serving wireless network 100 via the PDN 600 (message flow 5).

On receipt of the subscriber data, the HLR/VLR/ISR 130 stops the subscriber data request timer and sends a copy of the received subscriber data to the VLR of the serving MSC to complete the registration process (message flow 6). The MSC 121 uses the stored subscriber data to determine what services to provide to the roaming mobile terminal 500.

The received subscriber data includes the MIN specified in the subscriber data request and the address of the HLR 430 containing the subscriber data for that MIN. The HLR/VLR/ISR 130 stores for future reference the MIN and the address of the HLR 430 in the ISR database, deleting oldest ISR database entry if this is necessary to accommodate the newly stored data. The HLR/VLR/ISR 130 also time stamps the newly stored data so that its age can be determined when further subscriber data is received at the HLR/VLR/ISR 130.

The HLR/VLR/ISR 130 also stores the received subscriber data in the VLR database, deleting oldest VLR database entry if this is necessary to accommodate the newly stored data, and time stamps the newly stored data so that its age can be determined when further subscriber data is received at the HLR/VLR/ISR 130.

If the subscriber data request timer reaches a predetermined subscriber data request expiry time before the requested subscriber data is received at the HLR/VLR/ISR 130, the HLR/VLR/ISR 130 initiates refusal of the registration request.

The subscriber data is retained in the VLR database of the HLR/VLR/ISR 130 for a predetermined time period, when the HLR/VLR/ISR 130 determines that the predetermined time period has expired (by comparing the current time to the time stamp of the subscriber data), it flushes the subscriber data. This forces the visiting mobile terminal 500 to re-register when it next requires service from the serving wireless network 100. The forced re-registration process refreshes the subscriber data for the visiting mobile terminal 500 in the serving wireless network 100 to ensure that it is up to date. Moreover, the flushing operation enables the HLR/VLR/ISR 130 to eliminate subscriber data for mobile terminals that are no longer being served by the first wireless network 100, so as to make room for the subscriber data of visiting mobile terminals that will later be served by the first wireless network 100.

Once the mobile terminal 500 de-registers at the serving MSC 121, the subscriber data is deleted from the VLR of the serving MSC 121. The subscriber data is temporarily stored at the VLR of the HLR/VLR/ISR 130 of the serving wireless network 100 (provided that the predetermined period for storage of the subscriber data at the VLR has not yet expired) in case the mobile terminal 500 re-registers in the wireless network 100. Should the visiting mobile terminal re-register while its subscriber data is temporarily stored in the VLR of the HLR/VLR/ISR 130, the message flows required for registration are as shown in FIG. 4, the required subscriber data being found in the VLR of the HLR/VLR/ISR.

However, as noted above, the subscriber data is flushed from the VLR of the HLR/VLR/ISR 130 at regular intervals and, due to the limited storage capacity of the VLR database, the subscriber data may be displaced by other subscriber data even before the period for storage of the subscriber data expires.

Figure 6:
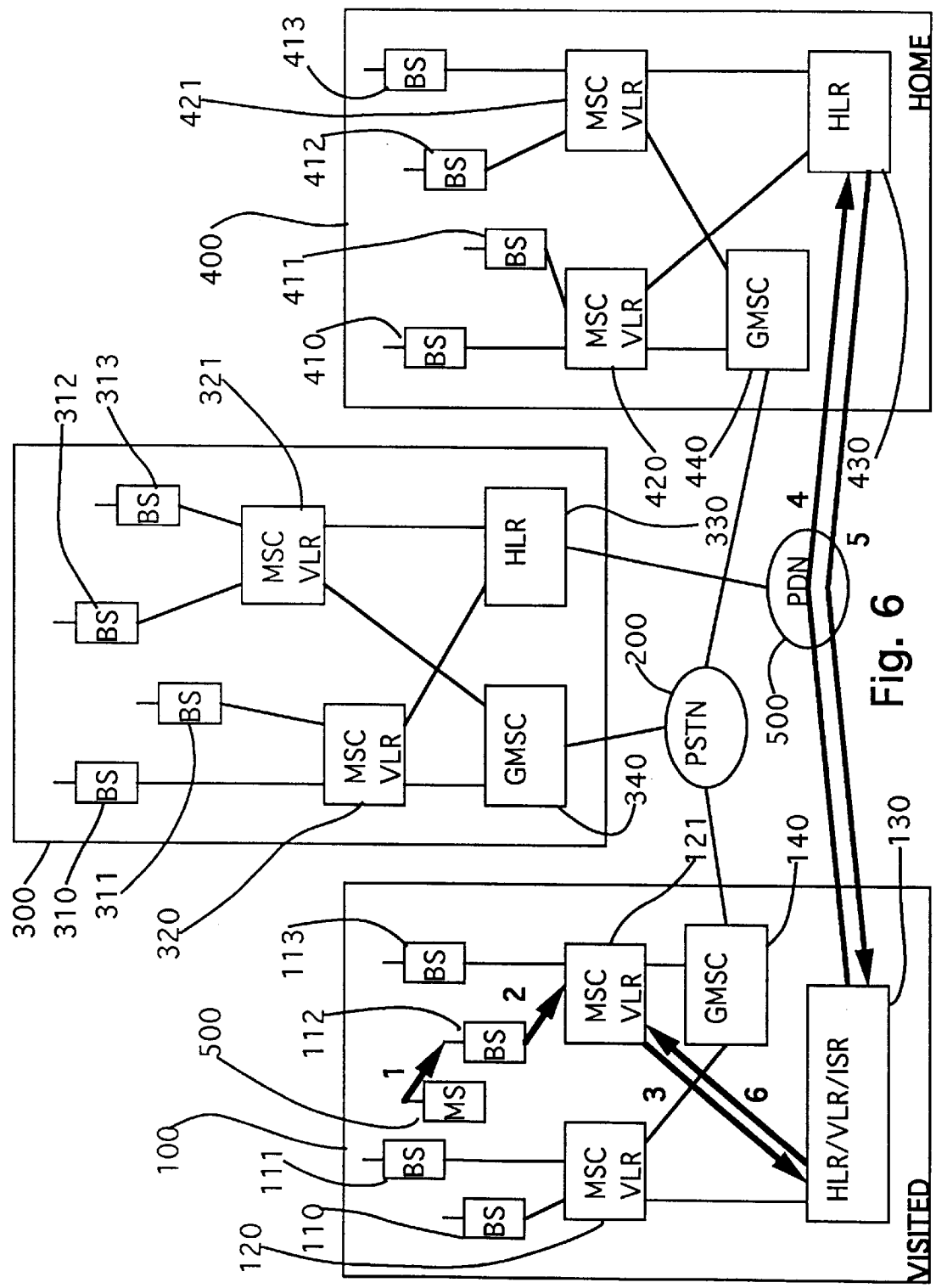
FIG. 6 is the block schematic diagram of FIG. 1 showing message flows required for re-registration of a mobile terminal in a wireless network other than its home wireless network.

The ISR database of the HLR/VLR/ISR 130 stores the MIN and the corresponding address of the HLR 430 for a longer duration. Consequently, should the mobile terminal 500 re-register in the first wireless network 100 after the subscriber data has been purged from the VLR of the HLR/VLR/ISR 130, but while the address of the HLR 430 is still stored in the ISR database, the message flows required to effect re-registration are as shown in FIG. 6.

In particular, message flows 1, 2, and 3 are as described above with reference to FIG. 5. However, the HLR/VLR/ISR 130 locates in the ISR database the address of the HLR 430 containing the subscriber data for the MIN specified in the subscriber data request. Accordingly, in message flow 4 the HLR/VLR/ISR 130 forwards the subscriber data request only to the HLR 430 which has the required subscriber data instead of broadcasting the subscriber data request to all connected HLRs (e.g. HLR 330). Because the processing and transport of broadcasted subscriber data requests can consume considerable network resources, elimination of the requirement for broadcasting can provide a significant benefits. Message flows 5 and 6 are then as described above with reference to FIG. 3.

The HLR/VLR/ISR 130 updates the time stamp for an entry in the ISR database each time that entry is used to locate the home HLR of a roaming terminal. This enables the ISR database to retain recently used entries in preference to entries which have not been recently used.

The ISR database also has limited storage capacity and, eventually, the address of the HLR 430 containing the subscriber data for the MIN will be displaced by the addresses for other visiting MINs or otherwise purged from the ISR database. Should the mobile terminal 500 re-register after the subscriber data has been purged from the VLR of the HLR/VLR/ISR 130 and the address of the HLR 430 has been purged from the ISR database, the re-registration process is as illustrated in FIG. 5.

The embodiments described above may be modified without departing from the principles of the invention, the scope of which is defined by the claims below.

Other arrangements for deletion of subscriber data from the VLR database of the HLR/VLR/ISR 130 or for deletion of subscriber data path information from the ISR database could be used. For example, the HLR/VLR/ISR 130 could be arranged to randomly select subscriber data for deletion when the storage capacity occupied by subscriber data information in the VLR database exceeds a predetermined threshold value. Similarly, the ISR database could be arranged to randomly select subscriber data path information for deletion when the storage capacity occupied by subscriber data path information exceeds a predetermined threshold value.

The second and third wireless networks 300, 400 could also have VLR and ISR functionality to support mobile terminals roaming into their service areas. This functionality could be integrated with the HLR functionality as shown in FIG. 2 or could be provided on distinct platforms. The HLR, ISR and VLR functionality could also be distributed over multiple platforms, for example the platforms that support the MSCs 120, 121 and their VLRS.

The HLR, VLR and ISR functionality for plural distinct wireless networks 100, 200, 300 could be integrated on a common platform. However, this would require cooperation and coordination between multiple service providers to provide and maintain the common functionality where the distinct wireless networks are operated by distinct service providers.

The subscriber data downloading procedures could also be extended so that the data for each subscriber is stored at more than one HLR. In this case, the subscriber data could be located and downloaded provided that access can be obtained any of the HLRs containing the required subscriber data. This would provide a measure of tolerance to HLR faults. In this case, additional functionality would be required to ensure that the requesting HLR selects only one set of downloaded subscriber data for downloading to the VLR of the serving MSC, and to ensure that administrative changes to the subscriber data are duplicated in each copy of the subscriber data.

In the embodiments described above, the required subscriber data is identified by the MIN of the mobile terminal. The MIN may be replaced by a subscriber identifier such that registration requests from any one of a number of terminals assigned to a particular subscriber access the same subscriber data, and the subscriber obtains similar services regardless of the particular terminal he is using.

I claim:

1. A method of obtaining subscriber data for a mobile terminal roaming into a service area of a visited wireless network, the method comprising:
    receiving a registration request from the mobile terminal at the visited wireless network, the registration request comprising an identifier;
    searching a Home Location Register (HLR) of the visited wireless network for subscriber data corresponding to the identifier;
    upon failure to find subscriber data corresponding to the identifier at the HLR, searching a Visitor Location Register (VLR) of the visited wireless network for subscriber data corresponding to the identifier;
    upon failure to find subscriber data corresponding to the identifier at the VLR, searching an Intersystem Roaming (ISR) database for an address corresponding to the identifier; and
    upon finding an address corresponding to the identifier in the ISR database, transmitting a subscriber data request comprising the identifier to the address.

2. A method of obtaining subscriber data for a mobile terminal roaming into a service area of a visited wireless network, the method comprising:
    receiving a registration request from the mobile terminal at the visited wireless network, the registration request comprising an identifier;
    searching a Home Location Register (HLR) of the visited wireless network for subscriber data corresponding to the identifier;
    upon failure to find subscriber data corresponding to the identifier at the HLR, searching a Visitor Location Register (VLR) of the visited wireless network for subscriber data corresponding to the identifier;
    upon failure to find subscriber data corresponding to the identifier at the VLR, searching an Intersystem Roaming (ISR) database for an address corresponding to the identifier;
    upon finding an address corresponding to the identifier in the ISR database, transmitting a subscriber data request comprising the identifier to the address; and
    upon failure to find an address corresponding to the identifier in the ISR database, broadcasting a subscriber data request to plural wireless networks connected to the visited wireless network.

3. A method as defined in claim 2, further comprising:
    starting a timer upon broadcasting the subscriber data request;
    stopping the timer when subscriber data corresponding to the identifier is received at the visited wireless network; and
    initiating refusal of the registration request when the timer exceeds a predetermined time and no subscriber data corresponding to the identifier has been received at the visited wireless network.

4. A method as defined in claim 2, further comprising, upon receiving subscriber data corresponding to the identifier at the visited wireless network, temporarily storing the subscriber data at the VLR of the visited wireless network, and storing an address corresponding to the identifier at the ISR database.

5. A method as defined in claim 4, further comprising:
    time stamping the subscriber data stored at the VLR; and
    deleting the subscriber data from the VLR when the subscriber data has been stored for a predetermined duration.

6. A method as defined in claim 4 further comprising:
    receiving plural files of subscriber data at the visited wireless network, each file corresponding to a respective identifier;
    storing each file of subscriber data at the VLR;
    when an occupancy of the VLR exceeds a predetermined threshold, selecting a file of subscriber data; and
    deleting the selected file of subscriber data at the VLR.

7. A method as defined in claim 6, further comprising time stamping each file of subscriber data stored at the VLR, wherein the step of selecting the file of subscriber data comprises selecting the file based on a value of its respective time stamp.

8. A method as defined in claim 4, further comprising:
time stamping the address stored at the ISR database; and
deleting the address from the ISR database when the address has been stored for a predetermined duration.

9. A method as defined in claim 8, further comprising updating the time stamp each time the address is read at the ISR database.

10. A method as defined in claim 4 further comprising:
receiving plural addresses at the visited wireless network, each address corresponding to a respective identifier;
storing each address with its respective identifier at the ISR database;
when an occupancy of the ISR database exceeds a predetermined threshold, selecting an address and its respective identifier; and
deleting the selected address and its respective identifier at the ISR database.

11. A method as defined in claim 10, further comprising time stamping each address stored at the ISR database, wherein the step of selecting the address comprises selecting the address based on a value of its respective time stamp.

12. A method as defined in claim 11, further comprising updating a respective time stamp each time an address is read at the ISR database.

13. A wireless system for providing service to a mobile terminal roaming into a service area of the wireless system, the wireless system comprising:
 a Home Location Register (HLR) for storing subscriber data for mobile terminals provisioned on the wireless network;
 a Visitor Location Register (VLR) for temporarily storing subscriber data for mobile terminals provisioned on other wireless networks;
 an Intersystem Roaming (ISR) database for storing addresses in association with identifiers;
 search means responsive to a registration request specifying a particular identifier for searching the HLR for subscriber data associated with the particular identifier, the search means being responsive to failure to find subscriber data associated with the particular identifier in the HLR to search the VLR for subscriber data associated with the particular identifier, and the search means being responsive to failure to find subscriber data associated with the particular identifier in the VLR to search the ISR database for an address associated with the particular identifier; and
 transmission means responsive to location of an address associated with the particular identifier in the ISR database to transmit a subscriber data request comprising the particular identifier to the address.

14. A wireless system for providing service to a mobile terminal roaming into a service area of the wireless system, the wireless system comprising:
 a Home Location Register (HLR) for storing subscriber data for mobile terminals provisioned on the wireless network;
 a Visitor Location Register (VLR) for temporarily storing subscriber data for mobile terminals provisioned on other wireless networks;
 an Intersystem Roaming (ISR) database for storing addresses in association with identifiers;
 search means responsive to a registration request specifying a particular identifier for searching the HLR for subscriber data associated with the particular identifier, the search means being responsive to failure to find subscriber data associated with the particular identifier in the HLR to search the VLR for subscriber data associated with the particular identifier, and the search means being responsive to failure to find subscriber data associated with the Particular identifier in the VLR to search the ISR database for an address associated with the particular identifier; and
 transmission means responsive to location of an address associated with the particular identifier in the ISR database to transmit a subscriber data request comprising the particular identifier to the address;
 wherein the transmission means is responsive to failure to locate an address associated with the particular identifier in the ISR database to broadcast a subscriber data request to plural other wireless systems.

15. A system as defined in claim 14, further comprising storage means responsive to receipt of subscriber data from other wireless systems to temporarily store the received subscriber data at the VLR and to store an address corresponding to the particular identifier at the ISR database.

16. A system as defined in claim 14, further comprising timing means for starting a timer in response to broadcast of a subscriber data request and for stopping the timer in response to receipt of the requested subscriber data, the timing means being operable to initiate refusal of the registration request when the timer exceeds a predetermined time and no subscriber data corresponding to the identifier has been received.

17. A system for supporting roaming of mobile terminals into a service area of a wireless network, the system comprising:
 a Visitor Location Register (VLR) for temporarily storing subscriber data for mobile terminals provisioned on other wireless networks;
 an Intersystem Roaming (ISR) database for storing addresses in association with identifiers;
 search means responsive to a failure to find subscriber data associated with a particular identifier specified in a registration request in the HLR to search the VLR for subscriber data associated with the particular identifier, and the search means being responsive to failure to find subscriber data associated with the particular identifier in the VLR to search the ISR database for an address associated with the particular identifier; and
 transmission means responsive to location of an address associated with the particular identifier in the ISR database to transmit a subscriber data request comprising the particular identifier to the address.

18. A system for supporting roaming of mobile terminals into a service area of a wireless network, the system comprising:
 a Visitor Location Register (VLR) for temporarily storing subscriber data for mobile terminals provisioned on other wireless networks;
 an Intersystem Roaming (ISR) database for storing addresses in association with identifiers;
 search means responsive to a failure to find subscriber data associated with a particular identifier specified in a registration request in the HLR to search the VLR for subscriber data associated with the particular identifier, and the search means being responsive to failure to find subscriber data associated with the particular identifier in the VLR to search the ISR database for an address associated with the particular identifier; and transmission means responsive to location of an address associated with the particular identifier in the ISR database to transmit a subscriber data request comprising the particular identifier to the address;

wherein the transmission means is responsive to failure to locate an address associated with the particular identifier in the ISR database to broadcast a subscriber data request to plural other wireless systems.

19. A system as defined in claim 18, further comprising storage means responsive to receipt of subscriber data from other wireless systems to temporarily store the received subscriber data at the VLR and to store an address corresponding to the particular identifier at the ISR database.

20. A system as defined in claim 18, further comprising timing means for starting a timer in response to broadcast of a subscriber data request and for stopping the timer in response to receipt of the requested subscriber data, the timing means being operable to initiate refusal of the registration request when the timer exceeds a predetermined time and no subscriber data corresponding to the identifier has been received.

* * * * *